United States Patent
Joshi et al.

(10) Patent No.: US 10,372,763 B2
(45) Date of Patent: Aug. 6, 2019

(54) GENERATING PROBABILISTIC ANNOTATIONS FOR ENTITIES AND RELATIONS USING REASONING AND CORPUS-LEVEL EVIDENCE

(71) Applicant: International Business Machines Corporation, Armonk, NY (US)

(72) Inventors: Sachindra Joshi, Bangalore (IN); Raghuram Krishnapuram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 14/797,634

(22) Filed: Jul. 13, 2015

(65) Prior Publication Data

US 2017/0017716 A1    Jan. 19, 2017

(51) Int. Cl.
*G06F 16/93* (2019.01)

(52) U.S. Cl.
CPC ................... *G06F 16/93* (2019.01)

(58) Field of Classification Search
CPC ..................... G06F 17/30011; G06F 16/93
See application file for complete search history.

(56) References Cited

U.S. PATENT DOCUMENTS

| | | | |
|---|---|---|---|
| 6,665,666 B1* | 12/2003 | Brown | G06F 17/30672 |
| 8,275,803 B2 | 9/2012 | Brown et al. | |
| 8,370,128 B2 | 2/2013 | Brun et al. | |
| 2005/0060301 A1* | 3/2005 | Seki | G06F 17/30654 |
| 2008/0313008 A1* | 12/2008 | Lee | G06Q 10/06 705/7.23 |
| 2009/0287678 A1* | 11/2009 | Brown | G06F 17/30654 |
| 2009/0326923 A1 | 12/2009 | Yan et al. | |
| 2010/0274815 A1* | 11/2010 | Vanasco | 707/798 |

(Continued)

OTHER PUBLICATIONS

Sutton et al. Collective Segmentation and Labeling of Distant Entities in Information Extraction, University of Massachusetts TR 04-49; Jul. 2004.

(Continued)

*Primary Examiner* — Kris E Mackes
*Assistant Examiner* — Lin Lin M Htay
(74) *Attorney, Agent, or Firm* — Ryan, Mason & Lewis, LLP (57) ABSTRACT

Methods, systems, and computer program products for generating probabilistic annotations for entities and relations using reasoning and corpus-level evidence are provided herein. A method includes determining candidate entities and candidate relationships between entities from text contained within textual documents associated with a given domain; generating questions to support or refute legitimacy of a given one of the candidate entities and/or a given one of the candidate relationships; automatically determining an answer to each of the questions based on analysis of one or more additional items of knowledge pertaining to the given domain; computing a confidence score for each answer; and assigning a confidence value in support of the legitimacy of the given one of the candidate entities and/or the given one of the candidate relationships, wherein said confidence value is based on an aggregation of the confidence scores for the answers to the one or more questions.

20 Claims, 3 Drawing Sheets

(56) References Cited

U.S. PATENT DOCUMENTS

| | | |
|---|---|---|
| 2011/0035210 A1 | 2/2011 | Rosenfeld et al. |
| 2013/0144685 A1* | 6/2013 | Reynolds ............... G06Q 10/06 705/7.32 |
| 2014/0040274 A1 | 2/2014 | Aravamudan et al. |
| 2014/0172883 A1* | 6/2014 | Clark ................ G06F 17/30038 707/749 |
| 2014/0365502 A1* | 12/2014 | Haggar ............. G06F 17/30684 707/748 |
| 2015/0356089 A1* | 12/2015 | Jamrog ............... G06F 17/3053 707/723 |

OTHER PUBLICATIONS

Merhav et al. Incorporating Global Information into Named Entity Recognition Systems using Relational Context, SIGIR 2010.

* cited by examiner

GENERATING PROBABILISTIC ANNOTATIONS FOR ENTITIES AND RELATIONS USING REASONING AND CORPUS-LEVEL EVIDENCE

FIELD

The present application generally relates to information technology, and, more particularly, to query resolution techniques.

BACKGROUND

Systems and enterprises create and accumulate information during execution of a multitude of processes. For example, information can be captured in different documents that are produced during a process, and such documents can be stored for potential future use in responding to queries. However, successful reuse of such information can depend on the structure of the information in the corresponding databases as well as search and retrieval ease and accuracy related thereto.

SUMMARY

In one aspect of the present invention, techniques for generating probabilistic annotations for entities and relationships using reasoning and corpus-level evidence are provided. An exemplary computer-implemented method can include steps of determining (i) one or more candidate entities and (ii) one or more candidate relationships between two or more entities from text contained within a set of textual documents associated with a given domain. The method also includes generating one or more questions to support or refute legitimacy of a given one of the candidate entities and/or a given one of the candidate relationships, wherein said one or more questions are generated based on (i) the given one of the candidate entities and/or the given one of the candidate relationships and (ii) one or more items of knowledge pertaining to the given domain, and wherein said generating is carried out by a query composer component executing on a hardware processor and communicatively linked to a domain knowledge storage component. Additionally, the method includes automatically determining an answer to each of the one or more questions based on analysis of one or more additional items of knowledge pertaining to the given domain; and computing a confidence score for each answer, wherein said confidence score is based on a comparison of a given answer to a database of annotated documents associated with the given domain, and wherein said computing is carried out by a confidence assignment component executing on the hardware processor and communicatively linked to an annotated document database. The method further includes assigning a confidence value in support of the legitimacy of the given one of the candidate entities and/or the given one of the candidate relationships, wherein said confidence value is based on an aggregation of the confidence scores for the answers to the one or more questions, and wherein said assigning is carried out by an evidence aggregation component executing on the hardware processor and communicatively linked to the confidence assignment component.

In another aspect of the invention, an exemplary computer-implemented method can include steps of determining (i) one or more candidate entities and (ii) one or more candidate relationships between two or more entities from text contained within a set of textual documents associated with a given domain. The method also includes generating one or more questions to support or refute legitimacy of each of the candidate entities and each of the candidate relationships, wherein each of said one or more questions is generated based on (i) the given candidate entity and/or the given candidate relationship and (ii) one or more items of knowledge pertaining to the given domain, and wherein said generating is carried out by a query composer component executing on a hardware processor and communicatively linked to a domain knowledge storage component. Additionally, the method includes automatically determining an answer to each of the one or more questions based on analysis of one or more additional items of knowledge pertaining to the given domain; and computing a confidence score for each answer, wherein said confidence score is based on a comparison of the given answer to a database of annotated documents associated with the given domain, and wherein said computing is carried out by a confidence assignment component executing on the hardware processor and communicatively linked to an annotated document database. The method further includes assigning a confidence value in support of the legitimacy of each of the candidate entities and each of the candidate relationships, wherein each confidence value is based on (i) an aggregation of the confidence scores for the answers to the one or more questions and (ii) a weight associated with each of the one or more questions, and wherein said assigning is carried out by an evidence aggregation component executing on the hardware processor and communicatively linked to the confidence assignment component. Also, the method includes ranking each of the candidate entities and each of the candidate relationships based on the confidence value in support of the legitimacy thereof; and storing each of the candidate entities and each of the candidate relationships based on said ranking.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes generating probabilistic annotations for entities and relations (also referred to herein as relationships) using reasoning and corpus-level evidence. At least one embodiment of the invention includes annotating entities and relations identified from each document in a document corpus and ranking the annotated entities and relations. Identification of entities and relations can be carried out using, for example, a statistical sequence model and/or using a set of dictionaries. Entities and relations can further be ranked using a score that characterizes each item's likelihood of being an entity or a relation. Such an embodiment also includes gathering evidence in support of each ranked entity and/or relation using the corpus, a reasoning mechanism, and one or more items of prior or existing knowledge.

As detailed herein, the reasoning mechanism formulates a set of supporting questions to gather additional evidence, discovers answers with associated confidence scores for each such supporting question, and aggregates the confidence scores associated with all of the supporting questions in the set. The supporting questions are generated using a set of pre-defined templates for each entity type and relation type. For example, consider the entity type "city." For any text segment which has been identified as a city type, say X, at least one embodiment of the invention can include generating questions such as "What is the population of X," "What is the total area of X," and so forth.

Further, at least one embodiment of the invention includes assigning confidence scores to entities and relations that are extracted (or identified, as noted above) from the corpus. Accordingly, such an embodiment includes identifying a candidate set of entities and relations using a statistical model and/or a rule-based approach. Also, such an embodiment includes generating the questions specific to certain entities, and based on the answers provided by a question answering system, ranking these entities and relations. Higher-ranked entities and relations are more likely to be the correct entities and relations.

As described herein, one or more embodiments of the invention includes annotating entities and relations in a document corpus by determining a candidate set of entities and relations from the corpus and ranking those entities and relations. As used herein, an "entity" refers to any specific or given object. Examples of entities include New York, Albert Einstein, etc. Entities can belong to "types," such as, for example, New York is of CITY type and Albert Einstein is PERSON type. A relation, as used herein, refers to a mapping between two entities. By way of example, entity Albert Einstein was born in entity Germany.

As noted, for each such entity and relation, at least one embodiment of the invention includes generating a set of supporting questions, and using a question answering system to generate answers for the supporting questions. A question answering (QA) system can include a black box mechanism. For example, in one or more embodiments of the invention, a QA system determines an answer, given a question, along with some score that characterizes the confidence of the QA system in the answer. For instance, for a question such as "What is the population of India," the QA system would generate an answer such as "1.2 billion." In an instance wherein the QA system does not provide an answer to a question that is generated using the templates for a specific entity, the QA system will nonetheless determine the appropriate answer type. For example, the QA system will identify that the question "What is the population of X" should have an answer which is of type NUMBER.

Additionally, such an embodiment further includes implementing a reasoning mechanism to determine a confidence score for each generated answer. The score is based on the confidence of the answer provided by the QA system and the weight associated with the question. By way of illustration, an example embodiment of the invention can include such a scoring function as follows. For aggregating evidences for city X:

Question 1 (Q1): What is the population of <X>?
  Answer=Y with probability $p_1$.
  Check→is Y a number?
Q2: Who is the mayor of <X>? Answer=Z with probability $p_2$.
  Check→is Z a person?
Q3: What is the total area of <X>? Answer=W with probability $p_3$.
  Check→is W a number?
If all checks are successful, then the total confidence=$p_1*w_1+p_2*w_2+p_3*w_3$, wherein $w_1$, $w_2$, and $w_3$ are weights associated with the corresponding supporting questions.

Figure 1:
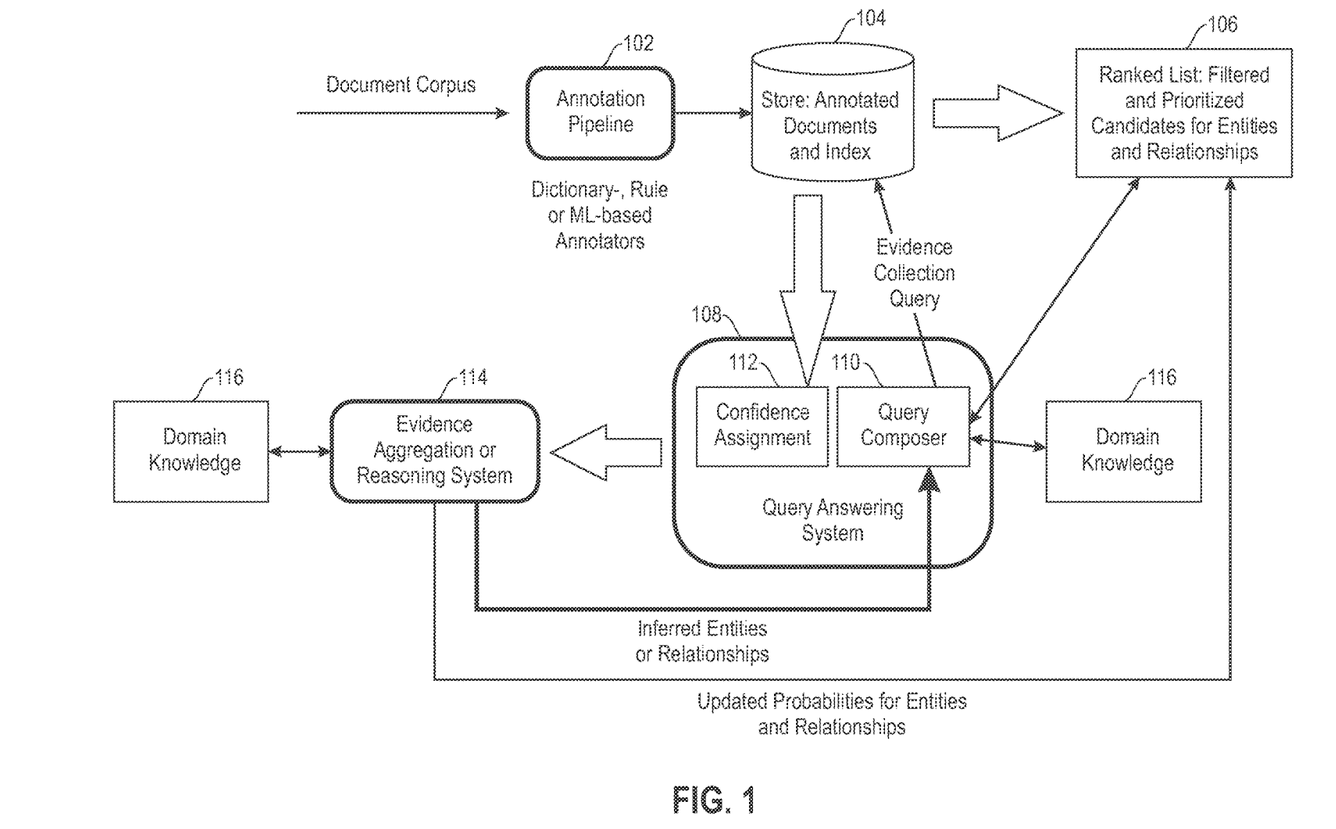
FIG. 1 is a diagram illustrating system architecture, according to an example embodiment of the invention.

FIG. 1 is a diagram illustrating system architecture, according to an embodiment of the invention. By way of illustration, FIG. 1 depicts an annotation pipeline component 102, an annotated documents and index database/store 104, a ranking component 106, a question answering (QA) system 108, and an evidence aggregation and/or reasoning system 114. The annotation pipeline component 102 is a component through which raw documents pass (for example, from a document corpus). One or more preprocessing actions can be applied to incoming documents via the annotation pipeline component 102 to cleanse and normalize text of the incoming documents. An example preprocessing action can include checking spelling errors and correcting such errors, etc. Subsequent to the application of any preprocessing actions, the annotation pipeline component 102 can additionally identify and apply (or tag) generic and/or domain-specific annotators to one or more sections of the text of the documents, wherein such annotators correspond to determined entities and/or relationships. The annotators can be dictionary-based, rule-based, and/or machine-learning-based.

The tagged documents are stored in database 104, and one or more types of indices are created such that all occurrences of certain types of entities can be retrieved from database 104. An index, as used herein, refers to a tool for retrieving all the occurrences of an identified entity in the corpus. Also, in one or more embodiments of the invention, the same word or phrase can be annotated differently depending on the context. Such instances can be considered as occurrences of different entities. Also, such instances can be implemented as part of the module that determines the candidate set of entities and relations. For example, some text string may refer to a person name or a location name depending of the context. For instance, "Washington" can refer to a city name as well as a name of a person.

As also depicted in FIG. 1, a ranked list of the noted entities and relationships are created via component 106 based on one or more criteria which can be based on heuristics (such as, for example, frequency of occurrence and/or location of entity in the document) and/or domain knowledge (for example, certain entities and relationships are more important or fundamental to a domain than others).

The question answering system 108, as depicted in FIG. 1, includes two components: a query composer 110 and a confidence assignment component 112. The query composer 110 takes one entity or relationship (at a time) from the ranked list and formulates a query that is based on the attributes of the entity or relationship that facilitate the gathering of additional evidence for the annotation associated with the entity or relation. By way merely of example, if the annotation for word X is "City Name," then the formulated query might be "Who is the mayor of X?" Further, assume that word Y was annotated as "State Name." If a relationship involving word X and word Y is to verified, the queries for word X and word Y might be "What state is X in?" and "What is the capital of Y?," respectively. Database 104 returns all candidate answers to such queries along with context information, which can include surrounding text and other information. As noted herein, the QA system 108 determines the answer to these question. Accordingly, for answering a given question x, the QA system uses database 104.

The confidence assignment component 112 computes a confidence score for each answer based on the context information provided. Module 112 is a part of QA system 108, and it is implemented to determine a confidence score corresponding to an answer that the QA system 108 determines for a given question. The confidence scores (also referred to herein as an item of evidence) computed for each given annotation is passed to the evidence aggregation and/or reasoning system 114 via the query answering system 108. Accordingly, at least one embodiment of the invention includes attempting to identify, for example, how likely it is that a text segment "X" is a city name (if X is identified as a candidate city name). As such, a set of questions is presented to the QA system. Such questions might include, for example, "Who is a mayor of X (which should have an answer Y which should be a person name with some confidence value corresponding thereto)," or "What is the population of X (which should have a number as an answer)," etc. Answers to these questions (and their corresponding confidence scores) act as evidence of "X" being a city name.

The evidence aggregator and/or reasoning system 114 takes the evidence (confidence scores) associated with each entity and/or relationship from the intelligent QA system 108 and aggregates the evidence to determine an overall probability and/or confidence value for the entity and/or relationship. The probability values are sent to the ranked list component 106, which can result in re-ranking of the entities and/or relationships. The entities and relationships with a high confidence value (for example, a confidence value above a given threshold) will also be sent to the query composer 110, which uses the provided information to formulate additional queries that can facilitate in gathering additional evidence for entities or relationships that have been examined previously. For example, if it is established strongly that word X is a city and that X is in state Y, then the evidence for another query of the type "in what country is state Y?" can establish a new relationship between city X and country Z.

As also depicted in FIG. 1, domain knowledge 116 plays a role in connection with the evidence aggregation and/or reasoning system 114 by providing constraints (as detailed above). Additionally, domain knowledge 116 can also help guide the query composer 110 in formulating queries. Domain knowledge can include relevant and/or possible questions for an entity type (and the answers corresponding thereto). For example, if the entity type is a person, then the person should have a birth date, and a relevant question might include querying when the person was born.

As noted above, the query composer 110 formulates a query that is based on the attributes of a given entity or relationship to facilitate the gathering of additional evidence for the annotation associated with the given entity or relation. In one or more embodiments of the invention, the query composer 110 can carry out template-based question formulation. Consider the following examples in connection with a given new entity. For instance, the query composer 110 can generate questions in support of the given new entity being a city (based, for example, on obtained domain knowledge) such as: "What is the population of X?," "Who is the mayor of X?," "What is the total area of X?," etc.

Similarly, consider the following examples in connection with a given new relationship (R) which identifies that individual X is the CEO of entity Y. For instance, the query composer 110 can generate questions in support of the relationship (R), such as "Who is the CEO of Y?," "X is the CEO of which company?," as well as generate questions in support of X being a company and/or in support of Y being a person/individual.

As also noted above, the evidence aggregator and/or reasoning system 114 takes the evidence (confidence scores) associated with each entity and/or relationship from the QA system 108 and aggregates the evidence to determine an overall probability and/or confidence value for the entity and/or relationship. In one or more embodiments of the invention, the evidence aggregator and/or reasoning system 114 can carry out rule-based evidence aggregation. By way of illustration, consider the following example queries for aggregating evidences for a word that represents the name of a city:

Q1: Does the population of X=Y with probability $p_1$, to determine whether Y is a number;

Q2: Is the mayor of X=Y with probability $p_2$, to determine whether Y is a person;

Q3: Is the total area of X=Y with probability $p_3$, to determine whether Y is a number.

If all three determinations are successful (that is, answered in the affirmative), then the resulting total confidence score (Total Conf)=$p_1*w_1+p_2*w_2+p_3*w_3$, wherein $w_1$, $w_2$, and $w_3$ are weights associated with the supporting questions. In one or more embodiments of the invention, weights can be provided and/or assigned manually. A weight characterizes how important that question is for the given entity type. For example, all PERSONS will have a birth date but not necessarily a death date, etc., and such questions can be weighted accordingly.

Additionally, in one or more embodiments of the invention, the evidence aggregator and/or reasoning system 114 can implement one or more machine learning models for aggregation of each entity and/or relationship type.

Figure 2:
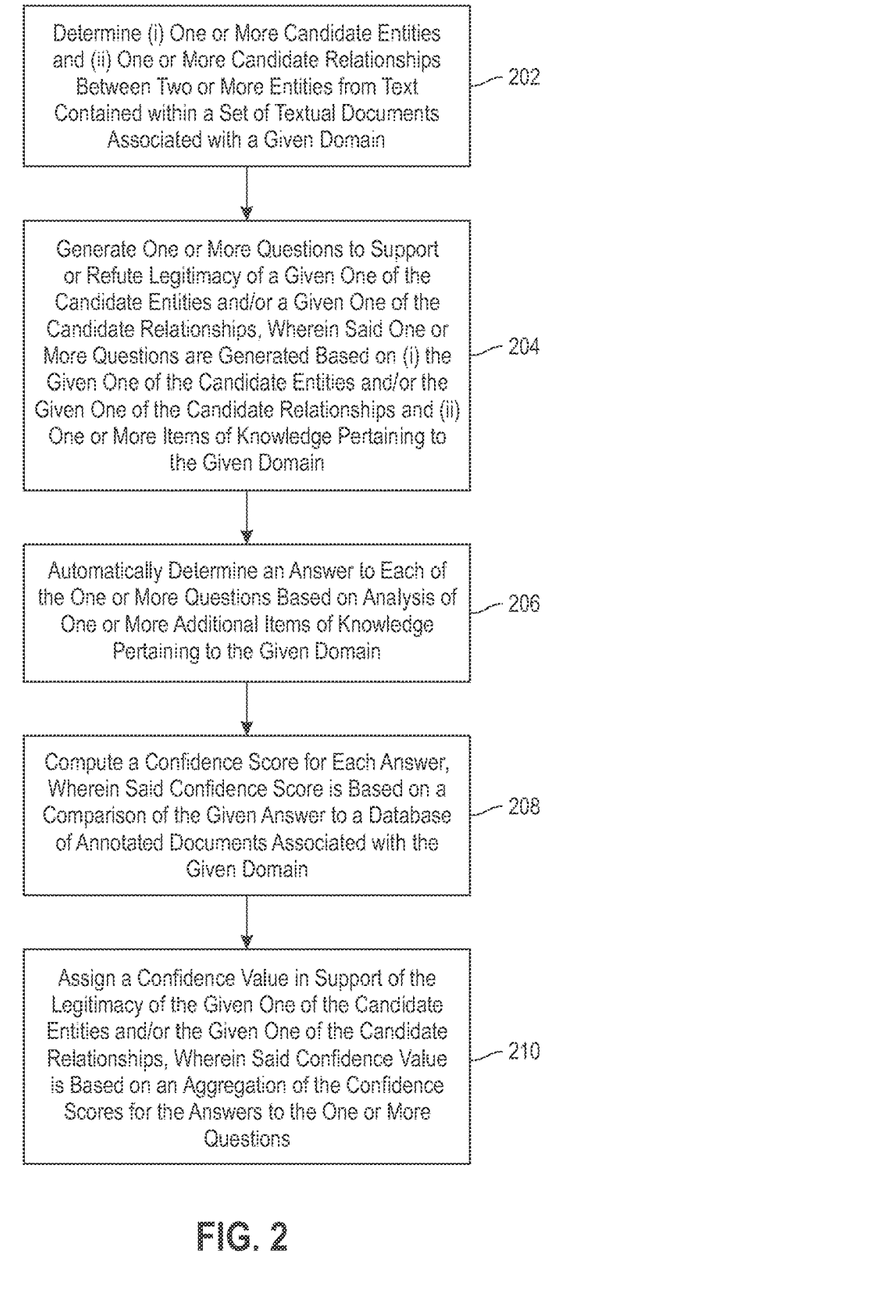
FIG. 2 is a flow diagram illustrating techniques according to an embodiment of the invention.

FIG. 2 is a flow diagram illustrating techniques according to an embodiment of the present invention. Step 202 includes determining (i) one or more candidate entities and (ii) one or more candidate relationships between two or more entities from text contained within a set of textual documents associated with a given domain.

Step 204 includes generating one or more questions to support or refute legitimacy of a given one of the candidate entities and/or a given one of the candidate relationships, wherein said one or more questions are generated based on (i) the given one of the candidate entities and/or the given one of the candidate relationships and (ii) one or more items of knowledge pertaining to the given domain, and wherein said generating is carried out by a query composer component executing on a hardware processor and communicatively linked to a domain knowledge storage component.

Generating the one or more questions can include, for example, implementing a template-based generation method.

Step 206 includes automatically determining an answer to each of the one or more questions based on analysis of one or more additional items of knowledge pertaining to the given domain. Such a step can be carried out and/or implemented via a question answering system such as, for example, IBM Watson™.

Step 208 includes computing a confidence score for each answer, wherein said confidence score is based on a comparison of the given answer to a database of annotated documents associated with the given domain, and wherein said computing is carried out by a confidence assignment component executing on the hardware processor and communicatively linked to an annotated document database. The comparison of the given answer to the database of annotated documents associated with the given domain can include a determination as to whether a given answer type associated with the given answer matches an expected answer type associated with the corresponding given question (as contained within the domain knowledge).

Step 210 includes assigning a confidence value in support of the legitimacy of the given one of the candidate entities and/or the given one of the candidate relationships, wherein said confidence value is based on an aggregation of the confidence scores for the answers to the one or more questions, and wherein said assigning is carried out by an evidence aggregation component executing on the hardware processor and communicatively linked to the confidence assignment component. Assigning the confidence value in support of the legitimacy of the given one of the candidate entities and/or the given one of the candidate relationships can include implementing a rule-based method and/or implementing a machine learning-based method.

The techniques depicted in FIG. 2 can also include annotating (i) the one or more determined candidate entities and (ii) the one or more determined candidate relationships in the set of textual documents associated with the given domain. Also, at least one embodiment of the invention includes generating a ranking of (i) the one or more determined candidate entities and (ii) the one or more determined candidate relationships based on an estimated legitimacy value. The estimated legitimacy value is based on an aggregated score calculated by combining multiple confidence scores associated with answers to multiple questions generated for a given candidate entity. Such an embodiment can also include updating the ranking based on the confidence value in support of the legitimacy of the given one of the candidate entities and/or the given one of the candidate relationships.

The techniques depicted in FIG. 2 can additionally include storing the (i) one or more determined candidate entities and (ii) the one or more determined candidate relationships. Storing can include storing (i) the one or more determined candidate entities and (ii) the one or more determined candidate relationships in an inverted index. Also, storing can include storing (i) the one or more determined candidate entities and (ii) the one or more determined candidate relationships in an extensible markup language index.

Also, an additional embodiment of the invention includes determining (i) one or more candidate entities and (ii) one or more candidate relationships between two or more entities from text contained within a set of textual documents associated with a given domain. Such an embodiment also includes generating one or more questions to support or refute legitimacy of each of the candidate entities and each of the candidate relationships, wherein each of said one or more questions is generated based on (i) the given candidate entity and/or the given candidate relationship and (ii) one or more items of knowledge pertaining to the given domain, and wherein said generating is carried out by a query composer component executing on a hardware processor and communicatively linked to a domain knowledge storage component. Additionally, such an embodiment includes automatically determining an answer to each of the one or more questions based on analysis of one or more additional items of knowledge pertaining to the given domain; and computing a confidence score for each answer, wherein said confidence score is based on a comparison of the given answer to a database of annotated documents associated with the given domain, and wherein said computing is carried out by a confidence assignment component executing on the hardware processor and communicatively linked to an annotated document database. Such an embodiment further includes assigning a confidence value in support of the legitimacy of each of the candidate entities and each of the candidate relationships, wherein each confidence value is based on (i) an aggregation of the confidence scores for the answers to the one or more questions and (ii) a weight associated with each of the one or more questions, and wherein said assigning is carried out by an evidence aggregation component executing on the hardware processor and communicatively linked to the confidence assignment component. Also, such an embodiment includes ranking each of the candidate entities and each of the candidate relationships based on the confidence value in support of the legitimacy thereof; and storing each of the candidate entities and each of the candidate relationships based on said ranking.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
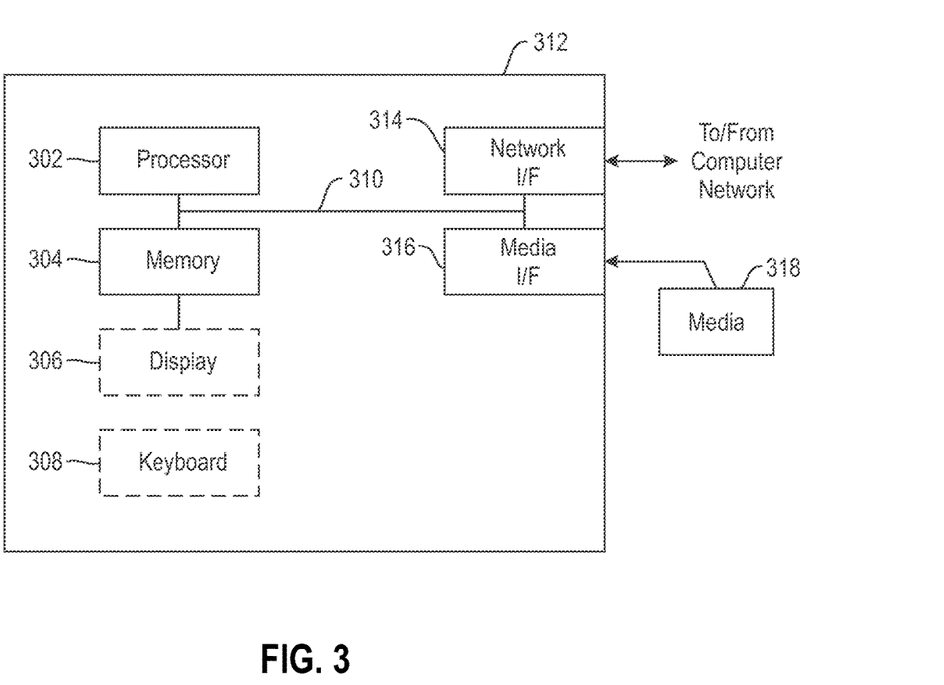
FIG. 3 is a system diagram of an exemplary computer system on which at least one embodiment of the invention can be implemented.

Additionally, an aspect of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, aggregating confidence values of supporting questions associated with an entity or a relation to support legitimacy of an identified entity or relation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining (i) one or more candidate entities and (ii) one or more candidate relationships between two or more entities from text contained within a set of textual documents associated with a given domain;
   generating one or more questions to support or refute legitimacy of a given one of the candidate entities or a given one of the candidate relationships, wherein said one or more questions are generated based on (i) the given one of the candidate entities or the given one of the candidate relationships and (ii) one or more items of knowledge pertaining to the given domain, and wherein said generating is carried out by a query composer component executing on a hardware processor and communicatively linked to a domain knowledge storage component;
   automatically determining an answer to each of the one or more questions based on analysis of one or more additional items of knowledge pertaining to the given domain;

computing a confidence score for each answer, wherein said confidence score is based on (i) a comparison of a given answer to a database of annotated documents associated with the given domain, and (ii) textual information including (a) text surrounding the given one of the candidate entities or the given one of the candidate relationships in the documents, (b) frequency of occurrence of the given one of the candidate entities or the given one of the candidate relationships in the documents, and (c) locations of the given one of the candidate entities or the given one of the candidate relationships in the documents, and wherein said computing is carried out by a confidence assignment component executing on the hardware processor and communicatively linked to an annotated document database; and assigning a confidence value in support of the legitimacy of the given one of the candidate entities or the given one of the candidate relationships, wherein said confidence value is based on an aggregation of (i) the confidence scores for the answers to the one or more questions and (ii) a distinct weight attributed to each of the one or more questions, wherein the distinct weight attributed to each of the one or more questions characterizes a level of importance attributed to the question for confirming a given entity type, and wherein said assigning is carried out by an evidence aggregation component executing on the hardware processor and communicatively linked to the confidence assignment component.

2. The method of claim 1, wherein comparison of the given answer to the database of annotated documents associated with the given domain comprises a determination as to whether a given answer type associated with the given answer matches an expected answer type associated with a corresponding given question.

3. The method of claim 1, wherein said generating the one or more questions comprises implementing a template-based generation method.

4. The method of claim 1, wherein said assigning the confidence value in support of the legitimacy of the given one of the candidate entities or the given one of the candidate relationships comprises implementing a rule-based method.

5. The method of claim 1, wherein said assigning the confidence value in support of the legitimacy of the given one of the candidate entities or the given one of the candidate relationships comprises implementing a machine learning-based method.

6. The method of claim 1, comprising:
annotating (i) the one or more determined candidate entities and (ii) the one or more determined candidate relationships in the set of textual documents associated with the given domain.

7. The method of claim 1, comprising:
generating a ranking of (i) the one or more determined candidate entities and (ii) the one or more determined candidate relationships based on an estimated legitimacy value.

8. The method of claim 7, wherein the estimated legitimacy value is based on an aggregated score calculated by combining multiple confidence scores associated with answers to multiple questions generated for a given candidate entity.

9. The method of claim 1, comprising:
storing the (i) one or more determined candidate entities and (ii) the one or more determined candidate relationships.

10. The method of claim 9, wherein said storing comprises storing (i) the one or more determined candidate entities and (ii) the one or more determined candidate relationships in an inverted index.

11. The method of claim 9, wherein said storing comprises storing (i) the one or more determined candidate entities and (ii) the one or more determined candidate relationships in an extensible markup language index.

12. A computer program product, the computer program product comprising a computer readable storage medium having program instructions embodied therewith, the program instructions executable by a computing device to cause the computing device to:

determine (i) one or more candidate entities and (ii) one or more candidate relationships between two or more entities from text contained within a set of textual documents associated with a given domain;

generate one or more questions to support or refute legitimacy of a given one of the candidate entities or a given one of the candidate relationships, wherein said one or more questions are generated based on (i) the given one of the candidate entities or the given one of the candidate relationships and (ii) one or more items of knowledge pertaining to the given domain, and wherein said generating is carried out by a query composer component executing on a hardware processor and communicatively linked to a domain knowledge storage component;

automatically determine an answer to each of the one or more questions based on analysis of one or more additional items of knowledge pertaining to the given domain;

compute a confidence score for each answer, wherein said confidence score is based on (i) a comparison of a given answer to a database of annotated documents associated with the given domain, and (ii) textual information including (a) text surrounding the given one of the candidate entities or the given one of the candidate relationships in the documents, (b) frequency of occurrence of the given one of the candidate entities or the given one of the candidate relationships in the documents, and (c) locations of the given one of the candidate entities or the given one of the candidate relationships in the documents, and wherein said computing is carried out by a confidence assignment component executing on the hardware processor and communicatively linked to an annotated document database; and assign a confidence value in support of the legitimacy of the given one of the candidate entities or the given one of the candidate relationships, wherein said confidence value is based on an aggregation of (i) the confidence scores for the answers to the one or more questions and (ii) a distinct weight attributed to each of the one or more questions, wherein the distinct weight attributed to each of the one or more questions characterizes a level of importance attributed to the question for confirming a given entity type, and wherein said assigning is carried out by an evidence aggregation component executing on the hardware processor and communicatively linked to the confidence assignment component.

13. The computer program product of claim 12, wherein said assigning the confidence value in support of the legitimacy of the given one of the candidate entities or the given one of the candidate relationships comprises implementing a rule-based method or a machine learning-based method.

14. The computer program product of claim 12, wherein the program instructions executable by the computing device further cause the computing device to:
   annotate (i) the one or more determined candidate entities and (ii) the one or more determined candidate relationships in the set of textual documents associated with the given domain.

15. A system comprising:
   a memory; and
   at least one processor coupled to the memory and configured for:
      determining (i) one or more candidate entities and (ii) one or more candidate relationships between two or more entities from text contained within a set of textual documents associated with a given domain;
      generating one or more questions to support or refute legitimacy of a given one of the candidate entities or a given one of the candidate relationships, wherein said one or more questions are generated based on (i) the given one of the candidate entities or the given one of the candidate relationships and (ii) one or more items of knowledge pertaining to the given domain, and wherein said generating is carried out by a query composer component executing on the at least one processor and communicatively linked to a domain knowledge storage component;
      automatically determining an answer to each of the one or more questions based on analysis of one or more additional items of knowledge pertaining to the given domain;
      computing a confidence score for each answer, wherein said confidence score is based on (i) a comparison of a given answer to a database of annotated documents associated with the given domain, and (ii) textual information including (a) text surrounding the given one of the candidate entities or the given one of the candidate relationships in the documents, (b) frequency of occurrence of the given one of the candidate entities or the given one of the candidate relationships in the documents, and (c) locations of the given one of the candidate entities or the given one of the candidate relationships in the documents, and wherein said computing is carried out by a confidence assignment component executing on the hardware processor and communicatively linked to an annotated document database; and
      assigning a confidence value in support of the legitimacy of the given one of the candidate entities or the given one of the candidate relationships, wherein said confidence value is based on an aggregation of (i) the confidence scores for the answers to the one or more questions and (ii) a distinct weight attributed to each of the one or more questions, wherein the distinct weight attributed to each of the one or more questions characterizes a level of importance attributed to the question for confirming a given entity type, and wherein said assigning is carried out by an evidence aggregation component executing on the at least one processor and communicatively linked to the confidence assignment component.

16. A method, comprising:
   determining (i) one or more candidate entities and (ii) one or more candidate relationships between two or more entities from text contained within a set of textual documents associated with a given domain;
   generating one or more questions to support or refute legitimacy of each of the candidate entities and each of the candidate relationships, wherein each of said one or more questions is generated based on (i) the given candidate entity or the given candidate relationship and (ii) one or more items of knowledge pertaining to the given domain, and wherein said generating is carried out by a query composer component executing on a hardware processor and communicatively linked to a domain knowledge storage component;
   automatically determining an answer to each of the one or more questions based on analysis of one or more additional items of knowledge pertaining to the given domain;
   computing a confidence score for each answer, wherein said confidence score is based on (i) a comparison of a given answer to a database of annotated documents associated with the given domain, and (ii) textual information including (a) text surrounding the given one of the candidate entities or the given one of the candidate relationships in the documents, (b) frequency of occurrence of the given one of the candidate entities or the given one of the candidate relationships in the documents, and (c) locations of the given one of the candidate entities or the given one of the candidate relationships in the documents, and wherein said computing is carried out by a confidence assignment component executing on the hardware processor and communicatively linked to an annotated document database;
   assigning a confidence value in support of the legitimacy of each of the candidate entities and each of the candidate relationships, wherein each confidence value is based on an aggregation of (i) the confidence scores for the answers to the one or more questions and (ii) a distinct weight attributed to each of the one or more questions, wherein the distinct weight attributed to each of the one or more questions characterizes a level of importance attributed to the question for confirming a given entity type, and wherein said assigning is carried out by an evidence aggregation component executing on the hardware processor and communicatively linked to the confidence assignment component;
   ranking each of the candidate entities and each of the candidate relationships based on the confidence value in support of the legitimacy thereof; and
   storing each of the candidate entities and each of the candidate relationships based on said ranking.

17. The method of claim 16, wherein comparison of the given answer to the database of annotated documents associated with the given domain comprises a determination as to whether a given answer type associated with the given answer matches an expected answer type associated with the corresponding given question.

18. The method of claim 16, wherein said generating the one or more questions comprises implementing a template-based generation method.

19. The method of claim 16, wherein said assigning a confidence value in support of the legitimacy of each of the candidate entities and each of the candidate relationships comprises implementing a rule-based method or a machine learning-based method.

20. The method of claim 16, comprising:
   annotating each of the candidate entities and each of the candidate relationships in the set of textual documents associated with the given domain.

* * * * *